Sept. 10, 1957 L. HOHEISEL 2,805,695
POWER OPERATED, END THRUST FINISHING CUTTER
Filed Feb. 13, 1956
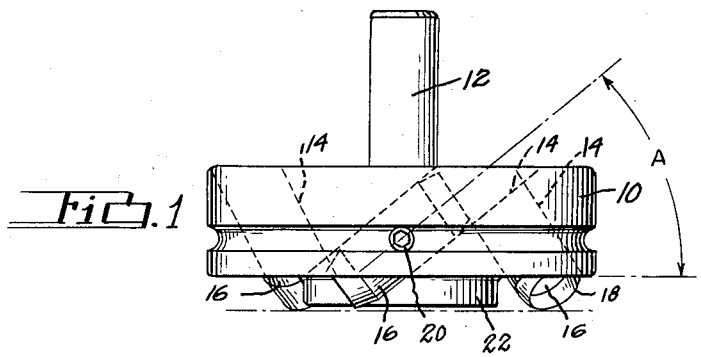
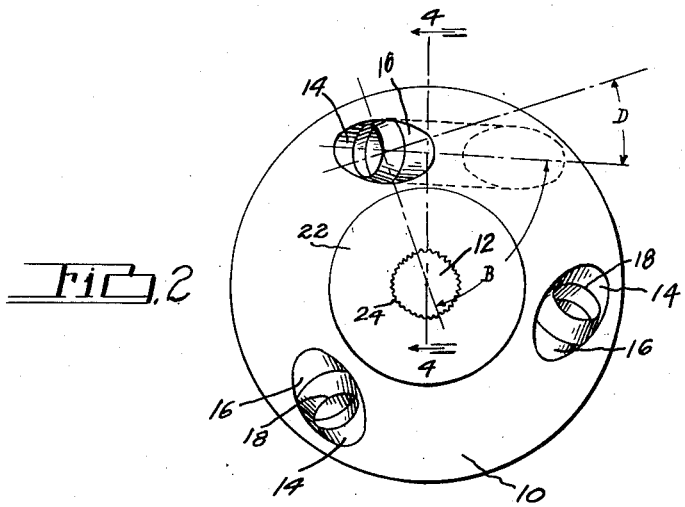
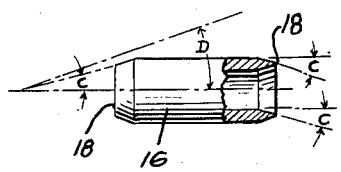
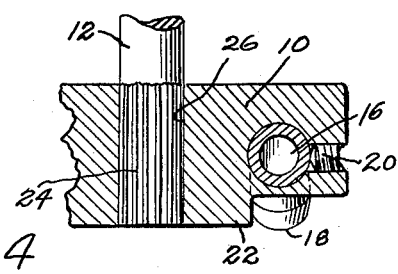
INVENTOR.
LOUIS HOHEISEL
BY
ATTORNEY

United States Patent Office 2,805,695
Patented Sept. 10, 1957

2,805,695

POWER OPERATED, END THRUST FINISHING CUTTER

Louis Hoheisel, Detroit, Mich.

Application February 13, 1956, Serial No. 565,049

3 Claims. (Cl. 144—219)

This invention relates to a face milling cutter of the rotary type for finishing a work surface having a plurality of cutter edges rotatable about a common axis.

Such cutters are adapted to be driven at relatively high speeds and to produce a cut crosswise of the grain of the work piece for the purpose of producing a uniformly smooth surface thereon. The present invention relates to a cutter head adapted to be power driven as, for example, in a drill press and in which the cutting edges of the blades may be adjusted with respect to the head which results in the production of a smooth, finished surface thereon.

An object of the invention is to provide a plurality of cutter blades which are tubular and present a circular cutting edge to the work and to arrange the axis of the blades at an angle to the axis of rotation, both in a vertical plane and in a horizontal plane; that is, the axis of each blade extends at an acute angle to the surface of the work and at an acute angle to a tangent of a radial line from the axis of rotation through the cutting edge of the blade.

Another object of the invention is to provide a guide portion on the cutting head adapted to contact the finished surface of the work thereby preventing chatter of the work and head.

Other objects and advantages of the invention will be more apparent from the following description taken in connection with the accompanying drawings, in which:

Fig. 1 is a side elevational view of the cutter head embodying the improved cutter blades;

Fig. 2 is a bottom plan view of the cutter head shown in Fig. 1;

Fig. 3 is a side elevational view of the cutter blade, partly broken away and in section; and Fig. 4 is a fragmentary sectional view of the cutter head and cutter blade, taken on line 4—4 of Fig. 2.

Referring to the drawings, the cutter head of the present invention comprises a body 10 of circular form which is secured to a spindle 12. The spindle is adapted to be secured in any desired type of tool holder such, for example, as a drill chuck on a drill press, not shown. The body portion 10 is provided with a plurality of radially spaced bores 14. These bores 14 are formed with their axes on an angle of approximately forty degrees with respect to the cutting plane of the head, as illustrated by the angle A in Fig. 1. The bores 14 are also formed having an angular relation to a radial line through the cutter head which intersects the bore axis at a point where the bore extends through the bottom face of the head, as illustrated by the angle B in Fig. 2. A desirable angle has been found to be seventy degrees. This angular relation gives the back clearance to the cutter which is important.

The cutter tool 16, more clearly shown in Fig. 3, comprises a tubular, tool steel member which is sharpened at each of its opposite ends to a knife edge 18. The sharpening may be done by grinding or honing the outer and inner peripheries of the tool 16 on an angle to the axis of the tool. A desired angle is fifteen degrees, as illustrated by the angles C in Fig. 3.

A cutter tool 16 is inserted in each of the bores 14 and the tools are positioned therein by placing the lower surface of the cutter head 10 on a flat surface with a thin sheet of paper therebetween. The sharp ends of the cutter tools 16 cut through the paper, thus giving a desired clearance between the depth of cut and the guide portion 22 to compensate for expansion of the head caused by heat. After the tools have thus been positioned in the bores they are locked in place by screws 20 in engagement with the outer periphery of the tool. It will be readily understood that when the cutting edge of each tool becomes dull, the tools may be rotated about their own axis, presenting a new and sharp cutting edge, since the cutting edge 18 is circular and concentric to the axis of the cutter tool. It will also be understood that when the cutting edge, at one end of the tool, has been dulled, the tool may be reversed and the opposite sharp end used. By such arrangement, a multiplicity of sharp cutting edges may be had eliminating frequent sharpening of tools heretofore used.

The cutter head is rotated at a rapid speed about the axis of the spindle 12, here shown in a clock-wise direction, and the tools cut the work in a path which may be considered as a tangent to a radial line to the axis of rotation. Since the axis of each bore 14 is at an angle of seventy degrees to that radial line, the axis of the bore is at an angle of twenty degrees to the tangent line, as indicated by the angle D in Figs. 2 and 3. The difference between the angles D and C is the angle of back clearance which is necessary for smooth finish cutting.

In the form herein illustrated the body 10 of the cutter head is provided with a guide portion 22, integral therewith, that is adapted to contact the finished surface of the work piece and to guide the cutting tools in the cutting of the unfinished portion of the surface. The cutting tools are thus guided in their cutting action from the smooth finished portion of the surface of the work piece and this eliminates chattering of the cutter head and the formation of resultant rough surfaces on the work piece.

The spindle 12 is provided with a straight spline 24 which is press fitted into a central aperture 26 in the body 10. The spindle 12 is preferably formed of steel and the body 10 of aluminum.

The invention has been herein illustrated and described specifically in connection with one form thereof but it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

I claim:

1. A rotary cutter head comprising, a spindle, a solid disc body member secured to said spindle, a plurality of bores through said body member intersecting each opposite face of said disc, the axes of said bores extending at an acute angle to the axis of said disc and at an acute angle to a tangent line on said disc which intersects the axes of the bores where they pass through the opposite faces of said disc body member, and a tubular cutter blade secured in each of said bores projecting through the lower face of said disc.

2. A rotary head comprising, a spindle, a disc body member secured thereto for rotation about a central axis, and a plurality of hollow tubular cutter blades projecting from one face of said disc body member, said cutter blades having sharp end cutting edges at their opposite ends.

3. A rotary cutter head comprising, a spindle, a disc body member secured thereto for rotation about a central axis, and a plurality of hollow tubular cutter blades projecting from the bottom face of said disc body member, said cutter blades having a sharp circular end cutting edge at the lower end thereof.

References Cited in the file of this patent

UNITED STATES PATENTS

| 1,361,305 | Buck | Dec. 7, 1920 |
| 2,214,449 | Berry | Sept. 10, 1940 |
| 2,618,301 | Newton | Nov. 18, 1952 |

FOREIGN PATENTS

| 619,362 | Great Britain | Mar. 8, 1949 |
| 691,212 | Great Britain | May 6, 1953 |